United States Patent Office 2,995,219
Patented Aug. 8, 1961

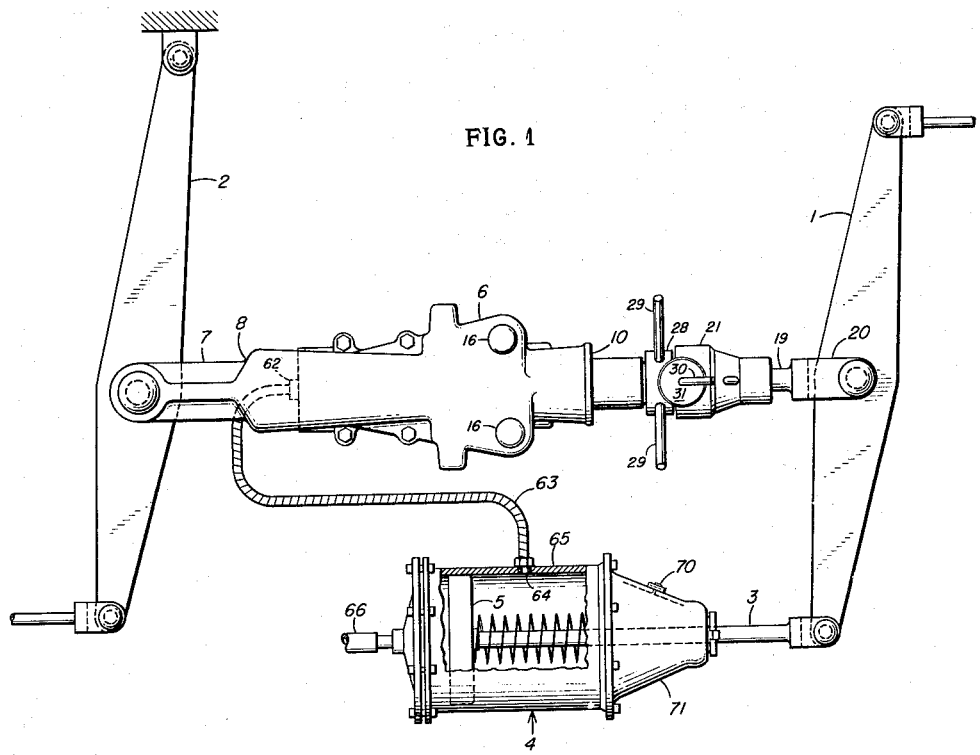

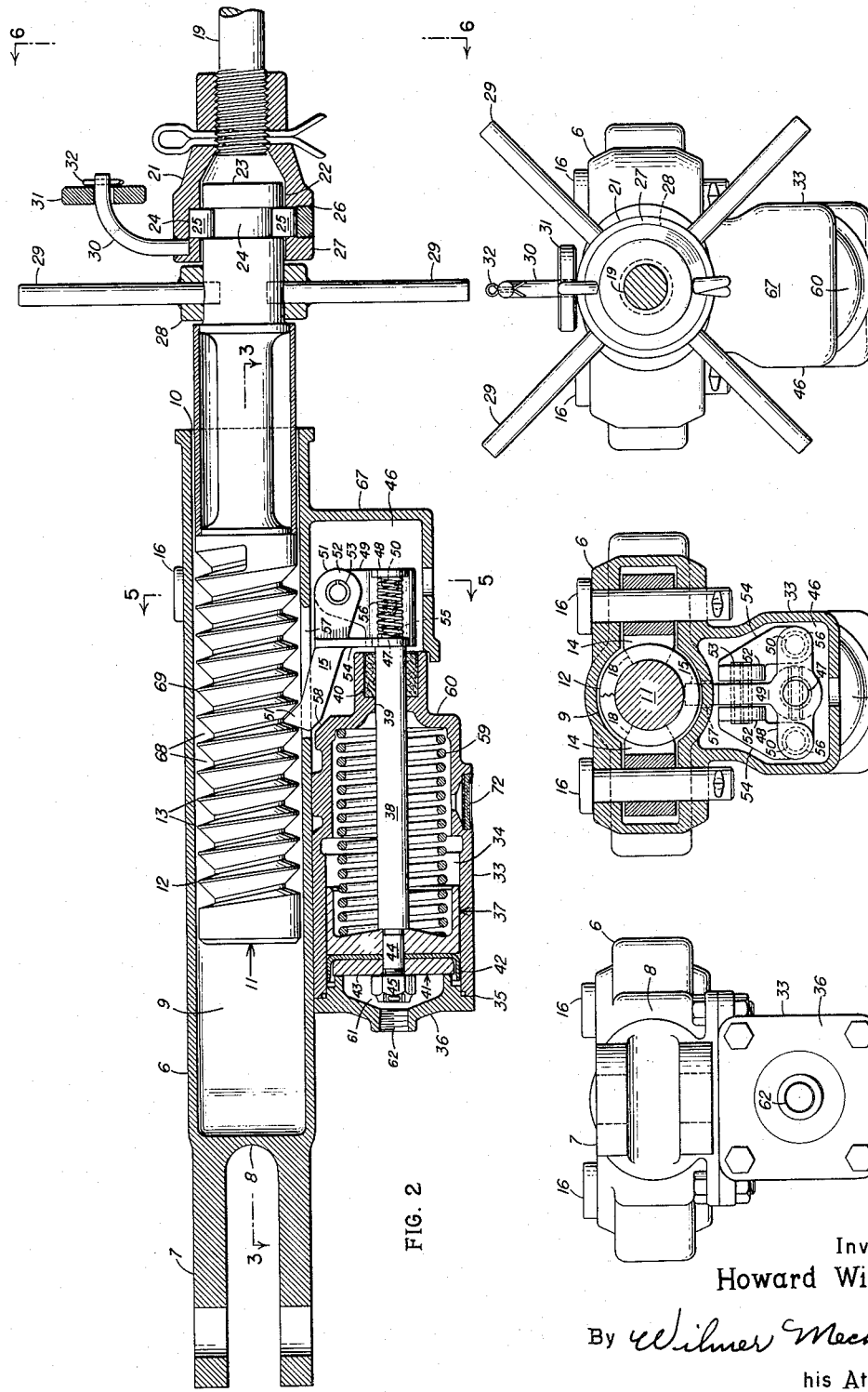

2,995,219
AUTOMATIC SLACK ADJUSTER
Howard Winther, East Aurora, N.Y., assignor to Symington Wayne Corporation, a corporation of Maryland
Filed Dec. 28, 1956, Ser. No. 631,646
11 Claims. (Cl. 188—200)

This invention relates to automatic slack adjusters for railway brake rigging and has for its primary object the provision of an improved automatic slack adjuster affording a linkage of variable length between a pair of brake levers and energized by fluid pressure on a brake application with excessive slack in the brake rigging, to take up slack by shortening the linkage.

Another object of the invention is to provide an improved automatic slack adjuster energized by fluid pressure to take up excess slack in a brake rigging by means of a pawl and rack connection between a pair of telescopingly related members, wherein the rack carried by one of the members is in the form of a screw thread, thereby enabling manual relative rotation of that member to pay out or take up slack.

An additional object of the invention is to provide an automatic slack adjuster having pawl and rack-connected relatively telescoping members and energized by fluid pressure to take up excess slack by relative telescoping of the members, wherein in the absence of fluid pressure on the slack adjuster, the members are locked by the pawl and rack connection against non-rotative relative longitudinal movement, thereby preventing false take-up or pay-out of slack.

A further object of the invention is to provide an improved automatic slack adjuster which is energized by fluid pressure automatically to take up excess slack by the non-rotative relative telescoping of a pair of telescopingly related members and is manually adjustable by relative rotation of the members to take up or pay out slack, wherein means are provided for locking the members against accidental relative longitudinal movement, whether rotative or non-rotative.

Other objects and advantages of the invention will appear hereinafter in the detailed description, be particularly pointed out in the appended claims and be illustrated in the accompanying drawings, in which:

FIGURE 1 is a fragmentary plan view of a brake rigging embodying a preferred embodiment of the automatic slack adjuster of the present invention;

FIGURE 2 is a vertical longitudinal sectional view on an enlarged scale of the automatic slack adjuster of FIGURE 1;

FIGURE 3 is a horizontal sectional view taken along the lines 3—3 of FIGURE 2;

FIGURE 4 is an end elevational view taken from the left end of FIGURE 2;

FIGURE 5 is a vertical sectional view taken along the lines 5—5 of FIGURE 2; and FIGURE 6 is a vertical sectional view taken along the lines 6—6 of FIGURE 2.

Referring now in detail to the drawings in which like reference characters designate like parts, the improved automatic slack adjuster of the present invention, while installable generally, in or as the linkage between a pair of linked brake levers of a railway brake rigging, has been illustrated installed as the linkage between a brake cylinder lever 1 and an associated dead lever 2, in place of the usual center pull rod. Of the two brake levers, the cylinder lever 1, conventionally, is pivotally connected at one end to a push rod 3 of an air brake cylinder 4 housing a brake piston 5 for actuating the push rod.

As illustrated, the improved automatic slack adjuster is comprised of a main housing or casing 6 which may be pivotally connected directly to an intermediate portion of one of the brake levers, here the dead lever 2, as through jaws 7 integral or rigid with and projecting axially of the housing from one end thereof and straddling the dead lever, closed at its end 8 carrying the jaws 7, the housing 6 having a hollow, preferably cylindrical interior 9 opening onto its opposite end 10, wherein is received a relatively telescoping or longitudinally or axially shiftable rack bar or power member 11.

In the preferred embodiment, the rack bar 11 has its ratchet 12 in the form of a coarse screw or helical thread engaging, through its teeth 13, one or more holding or main pawls 14 and an adjusting pawl 15. The several pawls 14 and 15 are spaced circumferentially about the housing 6 and the screw 12 of the rack bar 11 and face or are directed inwardly of its open end 10, so as, while in engagement, to prevent non-rotative movement of the rack bar 11 outwardly of the housing. The illustrated pair of holding pawls 14 are mounted in the housing 6 at opposite sides of its hollow interior 9 and are pivotally connected thereto, as by pivot pins 16, to pivot about fixed axes, being urged into engagement with the ratchet 12, by coil or like springs 17, each acting transversely between the housing and the head 18 of one of the pawls. The adjusting pawl on the other hand, as will be explained hereinafter, has its pivotal axis shiftable longitudinally or axially of the housing.

Outwardly of the housing 6, the rack bar 11 is connected against relative longitudinal movement to a connecting rod or like rigid member 19, which in turn is pivotally connected as through an integral clevis 20 to an intermediate portion of the other of the pair of brake levers, here the cylinder lever 1. While relatively immovable longitudinally, the rack bar 11 and connecting rod 19 are made relatively rotatable, the desired connection being obtainable by a coupling 21 pinned or keyed to the connecting rod and having an axial socket 22 receiving the outer end 23 of the rack bar, the socket and outer end of the rack bar having confronting annular grooves or races 24 in which ride rollers 25 insertible into the socket 22 of the coupling 21 through a normally plugged hole 26 in the side wall 27.

Inwardly of the coupling 21 toward the housing 6, the rack bar 11 has fixed to it a collar 28 which serves both to limit the telescoping of the rack bar relative to the housing by abutting against the outer or open end 10 of the latter and as a hub for a plurality of radiating, circumferentially spaced spokes 29 through which the rack bar may be rotated manually to adjust the length of the slack adjuster and thus of the linkage between the levers 1 and 2, the pawls 14 and 15 then serving as the complementary thread on the housing. Accidental or undesired rotation of the rack bar relative to the housing may be prevented by mounting on the top of the coupling 21 an upstanding, backwardly bent rod 30 on which slides a locking disk 31, the disk 31 being slidable to the outer end of the rod 30 against the cotter pin 32 to release the rack bar for rotation but, if forgotten, being displaced from that position by the first jolt and normally lying on the coupling 21 and projecting between adjoining of the spokes 29 to lock the rack bar against rotation.

With rotation of the rack bar 11 enabling slack in the brake rigging manually to be taken up or payed out, the adjusting pawl 15 and its associated mechanism are depended on for taking up slack automatically. To this end, the slack adjuster is so arranged and constructed that the adjusting pawl will be shifted outwardly or toward the outer end 10 of the housing 6 each time that, because of excess slack in the brake rigging, the stroke of the brake piston 5 exceeds its stroke with normal slack. Shifted a predetermined distance on each such brake application, the adjusting pawl 15, as it returns to normal position, will carry the rack bar with it and take up slack by a corresponding shortening of the linkage between the brake levers 1 and 2.

The desired shifting of the adjusting pawl 15 is obtained by attaching or fixing to a side of the main housing 6, an adjusting or auxiliary housing 33 having an axial cylindrical bore 34 disposed substantially parallel to the longitudinal axis of the main housing and open at one, here the inner end 35 of the adjusting housing. The open end 35 of the adjusting housing 33 normally is closed by a cap or cover 36, removably attached, as by bolting, to the adjusting housing and in a preferably enlarged portion of the bore 34 adjoining that end rides, slides or reciprocates an adjusting piston 37. The piston 37 has a stem or piston rod 38 which extends or projects through an axial passage 39 in the adjusting housing 33 at the opposite or outer end of the bore 34, the stem 38 there sliding in a self-lubricating packing or other suitable slide bearing 40. The piston 37 preferably is formed of a head 41, sealed to the bore 34 by a packing cup 42 and packing follower 43, all held on a restricted inner end portion or neck 44 of the stem 38 by a nut 45.

Outwardly beyond the passage 39, the stem 38 extends or projects into a compartment 46 in a portion of the adjusting housing 33, which conveniently may be formed integrally with the main housing 6. This projecting or outer end portion 47 of the stem 38 carries the adjusting pawl 15 in such manner that the pawl is shiftable longitudinally or axially with the adjusting piston 37 and at the same time is yieldably urged into engagement with the ratchet 12 on the rack bar 11. This is here accomplished by pinning to the end portion 47 of the stem 38 a crosshead 48 having an upstanding or, relative to the main housing 6, instanding, transversely apertured lug 49 and at either side, substantially on a level with the stem, a spring seat 50. Correspondingly, the end portion of the adjusting pawl 15, opposite to its head 51 is bifurcated to provide a pair of transversely spaced and apertured ears 52 straddling and pivotally connected to the lug 49 by a pivot pin 53 which may be in the form of a split bushing. Integral with the pawl 15 and depending or outstanding, relative to the main housing 6, from the ears 52 are a pair of legs 54, each carrying a spring seat 55 confronting or opposing and spaced inwardly of the adjusting housing 33 from one of the spring seats 50 on the crosshead 48. Seated between and acting on each of the opposing pairs of the spring seats 50 and 55 is a coil or like spring 56, the springs 56, while disposed longitudinally of the main housing 6, acting through the pivot pin 53 to urge the head 51 of the adjusting pawl 15 transversely into engagement with the ratchet 12.

As will be noted the head 51 of the adjusting pawl 15 rides in an elongated slot 57 connecting the interiors of the two housings and, when in its normal position shown in FIGURE 2, is locked or held against outward displacement radially of the rack bar 11 by a stop, abutment or shoulder 58 on the adjusting housing 33, in turn then locking or holding the rack bar against non-rotative longitudinal movement relative to the main housing 6. The head 51 of the adjusting pawl is normally held in this position by a return spring 59 acting between the piston 37 and the closed end 60 of the bore 34 and normally urging the piston against the cap 36.

For actuating the piston 37 by a fluid or line pressure and thus causing the adjusting pawl 15 to shift in response to an excessive stroke of the brake piston 5, there is provided in the bore 34 between the piston and the cap 36 a fluid chamber 61, fluid-connected, through a port 62 in the cap and flexible tubing or piping 63, to an orifice or port 64 in the side wall 65 of the brake cylinder 4. The orifice 64 is so positioned or situated longitudinally of the brake cylinder as normally to be blocked from the air inlet or feed port 66 of the latter by the brake piston 5 but to be open or exposed to the feed port when the stroke of the brake piston on a brake application exceeds a predetermined or normal limit or stroke due to excess slack in the brake rigging, the "normal" stroke being established by the A.A.R. as from seven to eight inches.

With the above construction and the adjusting piston 37 limited by the spacing between the crosshead 48 and the outer end wall 67 of the compartment 46 to a stroke sufficient to shift the head 51 of the adjusting pawl 15 from one to the next or succeeding of the spaces 68 between the teeth 13 of the ratchet 12, a brake application requiring an excessive or greater than normal stroke of the brake piston 5 due to excess slack will admit line or fluid pressure from the feed port 66 through the orifice 64, flexible tubing 63 and port 62 to the fluid chamber 61 in the adjusting housing 33 and shift the adjusting piston 37 to the limit of its stroke against the yieldable resistance of the return spring 59. Shifting longitudinally with the adjusting piston 37, the adjusting pawl 15 will have its head 51 moved clear of the stop shoulder 58 on the adjusting housing at the outset and thereafter be forced against the resistance of the associated springs 56 to ride over the crest 69 of the intervening of the teeth 13 and into the succeeding of the tooth spaces or roots 68. During this outward shift of the adjusting pawl relative to the main housing 6, the rack bar 11 is held against longitudinal movement relative to the main housing by the holding pawls 14, full seating of the latter in the confronting of the spaces 68 between the teeth 13 preferably being ensured by the provision of some lateral play between the rack bar and the main housing. As a consequence, when the brakes subsequently are released, the return spring 59 will restore the adjusting pawl to initial or normal position and, through engagement of the adjusting pawl with the ratchet 12, cause the rack bar 11 to telescope or shift inwardly relative to the main housing 6 the distance of one tooth, the holding pawls 15 in process being displayed radially and ultimately dropping into the next of the tooth spaces 68. This incremental inward shifting of the rack bar will continue on succeeding brake applications until the slack has been restored to normal, whereafter, the adjusting pawl and associated mechanism will become inoperative and remain so until there is again excess slack in the brake rigging.

Whenever the adjusting pawl is inactive or inoperative, the stop or shoulder 58 on the adjusting housing 33, which normally backs up the head 51 of the pawl, is effective through the adjusting pawl to lock the rack bar and main housing 6 against relative telescoping or longitudinal movement, this locking action obtaining during a normal brake application, as well as when the brakes are idle and the latter effectively preventing false take-up or pay-out of the slack adjuster under service shocks. As will be noted, the fluid chamber 61 will be bled to the atmosphere through the usual screened breather port 70 in the tapered end portion 71 of the brake cylinder 4 and a like breather port 72 preferably is provided for the bore 34 of the adjusting housing 33 beyond the stroke of the adjusting piston 37, the bleeding of the fluid chamber and the breathing of the bore eliminating any resistance by back pressure to the return force of the spring 59.

The slack adjuster will act automatically to take up slack in the above manner to the extent of the permissive telescoping of the rack bar 11 relative to the main housing 6, this being gauged to accommodate the maximum permissive wear in a set of brake shoes. Thereafter, or at any other time that additional slack may be needed, the slack may be payed out either part-way or to the inner limit of the ratchet 12 by manual rotation of the rack bar through the spokes 29. On subsequent return to service, the slack adjuster again will automatically take up slack as necessary to compensate for excess slack in the brake rigging.

From the above detailed description it will be apparent that there has been provided an improved automatic slack adjuster which, while relatively simple in construction, is effective in operation. It should be understood that the described and disclosed embodiment is merely exemplary of the invention and that all modifications are intended to be included which do not depart from either the spirit of the invention or the scope of the appended claims.

Having described the invention, what is claimed as new and useful is:

1. In an automatic slack adjuster, the combination with a pair of brake levers, of a housing connected to and movable with one of said levers, screw means in said housing and connected to said other lever, fluid-actuated pawl means carried by said housing and shiftable longitudinally relative thereto and to said screw means for effecting non-rotative relative longitudinal movement of said screw means and housing, means spaced about said screw means from said pawl means for yieldably resisting said relative movement of said screw means and housing, and means carried by said housing and acting through said pawl means for normally locking said housing and screw means against relative longitudinal movement.

2. In an automatic slack adjuster, the combination with a pair of brake levers, of a housing connected to and movable with one of said levers, rack means in said housing and connected to said other lever, fluid-actuated pawl means carried by said housing and shiftable longitudinally relative thereto and to said rack means for effecting relative longitudinal movement of said rack means and housing, means spaced about said screw means from said pawl means for yieldably resisting said relative movement of said screw means and housing, and means carried by said housing and acting through said pawl means for normally locking said housing and rack means against relative longitudinal movement.

3. In an automatic slack adjuster, the combination with a pair of brake levers, of a housing connected to one of said brake levers, coarse-threaded screw means in said housing and connected to said other brake lever, fluid-actuated pivoted pawl means carried by and pivotable relative to said housing and shiftable longitudinally relative thereto and to said screw means for effecting non-rotative longitudinal movement of said screw means relative to said housing, and means carried by said housing and spaced thereabout from said pawl means and yieldably urged radially into engagement with said screw means for holding said screw means against longitudinal movement relative to said housing on shift of said pawl means in one direction, said last-named and pawl means cooperating to threadedly engage said screw means and permit rotation thereof to shift said screw means longitudinally relative to said housing.

4. In an automatic slack adjuster, the combination with a pair of brake levers, of a housing connected to one of said brake levers, screw means in said housing and connected to said other brake lever, fluid-actuated pivoted pawl means carried by and pivotable relative to housing and shiftable longitudinally relative thereto and to said screw means for effecting non-rotative longitudinal movement of said screw means relative to said housing, means carried by said housing and displaceable radially of said screws means for holding said screw means against longitudinal movement relative to said housing on shift of said pawl means in one direction, said displaceable and pawl means cooperating to threadedly engage said screw means and permit rotation thereof to shift said screw means longitudinally relative to said housing, and means connected against rotation to said other lever and engageable with means fixed to said screw means for normally locking said screw means against rotation.

5. In an automatic slack adjuster, the combination with a pair of brake levers, of a housing connected to one of said brake levers, coarse-threaded screw means in said housing and rotatably connected to said other brake lever, fluid-actuated pivoted pawl means carried by said housing and shiftable longitudinally relative thereto and to said screw means for effecting non-rotative longitudinal movement of said screw means relative to said housing, and pivoted means carried by said housing and spaced thereabout from said pawl means and yieldably urged radially into engagement with said screw means for holding said screw means against longitudinal movement relative to said housing on shift of said pawl means in one direction, said last-named and pawl means cooperating to threadedly engage said screw means and permit rotation thereof to shift said screw means longitudinally relative to said housing.

6. In an automatic slack adjuster, the combination with a pair of brake levers, of a housing connected to one of said brake levers, coarse-threaded screw means in said housing and connected to said other brake lever, adjusting pivoted pawl means carried by said housing and shiftable longitudinally relative thereto and to said screw means for effecting non-rotative longitudinal movement of said screw means relative to said housing, and holding pivoted pawl means carried by said housing and spaced thereabout from said pawl means and yieldably urged radially into engagement with said screw means for holding said screw means against longitudinal movement relative to said housing on shift of said adjusting pawl means in one direction, said adjusting and holding pawl means cooperating to threadedly engage said screw means and permit rotation thereof to shift said screw means longitudinally relative to said housing.

7. In an automatic slack adjuster, the combination with a pair of brake levers, of a main housing connected to one of said levers, rack means in and slidable longitudinally relative to said main housing and connected to said other lever, an adjusting housing fixed to said main housing, a piston in said adjusting housing, an adjusting pawl pivotally connected to said piston and shiftable therewith on application of fluid pressure thereto relative to said main housing for effecting relative longitudinal movement of said rack means and main housing, means spaced about said main housing from said pawl for yieldably resisting said relative movement of said rack means and main housing, and means on said adjusting housing and acting through said adjusting pawl for normally locking said rack means and housing against relative longitudinal movement.

8. In an automatic slack adjuster, the combination with a pair of brake levers, of a main housing connected to one of said levers, rack means in and slidable longitudinally relative to said main housing and connected to said other lever, an adjusting housing fixed to said main housing, a piston in said adjusting housing, an adjusting pawl pivotally connected to a stem of said piston, spring means directed axially of said stem and acting therebetween and said adjusting pawl for urging said adjusting pawl into engagement with said rack means, said adjusting pawl being shiftable with said piston on application of fluid pressure thereto relative to said main housing for effecting relative longitudinal movement of said rack means and main housing, means spaced about said main housing from said pawl for yieldably resisting said relative movement of said rack means and main housing, and means on said adjusting housing and acting through said adjusting pawl for normally locking said rack means and housing against relative longitudinal movement.

9. In an automatic slack adjuster, the combination with a pair of brake levers and a brake cylinder, of a main housing connected to one of said levers, screw means in and shiftable longitudinally of said housing and rotatably connected to said other lever, an adjusting housing fixed to said main housing and fluid-connected to said brake cylinder, an adjusting piston in said adjusting housing and shiftable in one direction longitudinally thereof against yieldable resistance on application of fluid pressure from said brake cylinder after a predetermined travel of a brake piston in said cylinder, an adjusting pawl pivotally connected to a stem of and shiftable longitudinally with said piston and yieldably engaging said screw means, holding pawl means pivotally mounted in said main housing and spaced thereabout from said adjusting pawl for holding said screw means against longitudinal movement relative thereto on shift of said adjusting pawl in said one direction, said adjusting pawl on subsequent release of brakes returning to initial position and through engagement therewith shifting said screw means inwardly of said main housing, and means on said adjusting housing and acting through said adjusting pawl for normally holding said screw means and main housing against relative longitudinal movement.

10. In an automatic slack adjuster, the combination with a pair of brake levers and a brake cylinder of a main housing connected to one of said levers, screw means in and shiftable longitudinally of said housing and rotatably connected to the other of said levers, an adjusting housing fixed to said main housing and fluid-connected to said brake cylinder, an adjusting piston in said adjusting housing and shiftable in one direction longitudinally thereof against yieldable resistance on application of fluid pressure from said brake cylinder after a predetermined travel of a brake piston in said cylinder, an adjusting pawl pivotally connected to a stem of and shiftable longitudinally with said piston and yieldably engaging said screw means, holding pawl means pivotally mounted in said main housing and spaced thereabout from said adjusting pawl for holding said screw means against longitudinal movement relative thereto on shift of said adjusting pawl in said one direction, said adjusting pawl on subsequent release of brakes returning to initial position and through engagement therewith shifting said screw means inwardly of said main housing, and means on said adjusting housing and acting through said adjusting pawl for normally holding said screw means and main housing against relative longitudinal movement, said adjusting pawl and holding pawl means cooperating to threadedly engage said screw means and permit rotation thereof to shift said screw means longitudinally relative to said main housing.

11. In an automatic slack adjuster, the combination with a pair of brake levers and a brake cylinder of a main housing connected to one of said levers, screw means in and shiftable longitudinally of said housing and rotatably connected to the other of said levers, an adjusting housing fixed to said main housing and fluid-connected to said brake cylinder, an adjusting piston in said adjusting housing and shiftable in one direction longitudinally thereof against yieldable resistance on application of fluid pressure from said brake cylinder after a predetermined stroke of a brake piston in said cylinder, an adjusting pawl pivotally connected to a stem of and shiftable longitudinally with said piston and yieldably engaging said screw means, holding pawl means pivotally mounted in said housing for holding said screw means against longitudinal movement relative thereto on shift of said adjusting pawl in said one direction, and means connected against rotation to said other lever and engageable with means fixed to said screw means for normally locking said screw means against rotation, said adjusting pawl on subsequent release of brakes returning to initial position and through engagement therewith shifting said screw means inwardly of said main housing, and said adjusting pawl and holding pawl means cooperating to threadedly engage said screw means and permit rotation thereof to shift said screw means longitudinally relative to said main housing.

References Cited in the file of this patent

UNITED STATES PATENTS

| | | |
|---|---|---|
| 144,582 | Westinghouse | Nov. 11, 1873 |
| 1,681,057 | Sauvage | Aug. 14, 1928 |
| 1,700,835 | Farmer | Feb. 5, 1929 |
| 1,879,668 | Farmer | Sept. 27, 1932 |
| 1,908,315 | Bryant | May 9, 1933 |
| 2,270,600 | Ohlson | Jan. 20, 1942 |
| 2,648,408 | Martin | Aug. 11, 1953 |
| 2,752,012 | Moorhead | June 26, 1956 |

FOREIGN PATENTS

| | | |
|---|---|---|
| 285,328 | Great Britain | Feb. 16, 1928 |